United States Patent

Ackler et al.

[11] Patent Number: 6,082,140
[45] Date of Patent: Jul. 4, 2000

[54] FUSION BONDING AND ALIGNMENT FIXTURE

[75] Inventors: Harold D. Ackler, Sunnyvale; Stefan P. Swierkowski; Lisa A. Tarte, both of Livermore; Randall K. Hicks, Stockton, all of Calif.

[73] Assignee: The Regents of the University of California, Oakland, Calif.

[21] Appl. No.: 09/334,438

[22] Filed: Jun. 16, 1999

[51] Int. Cl.$^7$ .................................................... C03B 23/20
[52] U.S. Cl. .................. 65/36; 65/42; 65/63; 65/152; 65/155; 65/169; 65/170; 65/374.15; 156/87; 156/104; 156/106; 156/286; 425/504; 425/388; 425/DIG. 60; 228/44.3
[58] Field of Search .................. 65/36, 42, 59.1, 65/59.2, 59.3, 63, 152, 154, 155, 357, 359, 170, 169, 374.15; 156/87, 104, 106, 286; 228/44.3, 47.1, 49.4; 425/504, 388, DIG. 60; 264/510

[56] References Cited

U.S. PATENT DOCUMENTS

| | | |
|---|---|---|
| 1,207,867 | 12/1916 | Cordes . |
| 1,818,235 | 8/1931 | McDaniel . |
| 3,355,078 | 11/1967 | Smith . |
| 5,015,909 | 5/1991 | Zhong et al. ........................ 313/105 R |
| 5,108,961 | 4/1992 | Zhong et al. ................................ 501/65 |
| 5,167,687 | 12/1992 | Muragishi et al. . |
| 5,378,955 | 1/1995 | Scott, Jr. et al. . |
| 5,565,729 | 10/1996 | Faris et al. ........................ 313/105 CM |
| 5,632,436 | 5/1997 | Niewold ................................... 228/121 |
| 5,882,465 | 3/1999 | McReynolds . |

OTHER PUBLICATIONS

JP 8034635 A (Abstract) Fusion Bonding Glass for Microchannel Plate; Feb. 6, 1996.

Primary Examiner—Stanley S. Silverman
Assistant Examiner—Michael P. Colaianni
Attorney, Agent, or Firm—Alan H. Thompson; L. E. Carnahan

[57] ABSTRACT

An improved vacuum fusion bonding structure and process for aligned bonding of large area glass plates, patterned with microchannels and access holes and slots, for elevated glass fusion temperatures. Vacuum pumpout of all the components is through the bottom platform which yields an untouched, defect free top surface which greatly improves optical access through this smooth surface. Also, a completely non-adherent interlayer, such as graphite, with alignment and location features is located between the main steel platform and the glass plate pair, which makes large improvements in quality, yield, and ease of use, and enables aligned bonding of very large glass structures.

11 Claims, 1 Drawing Sheet

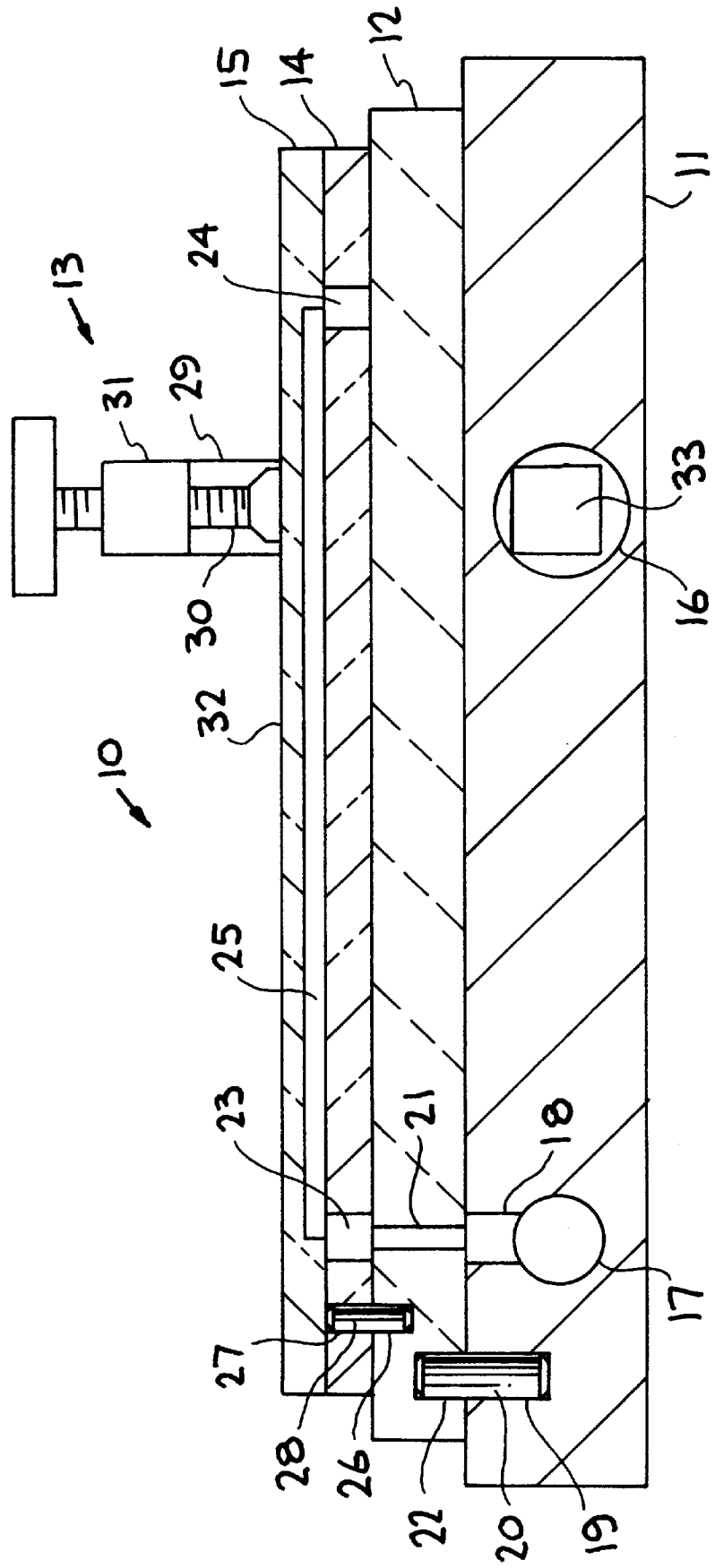

FUSION BONDING AND ALIGNMENT FIXTURE

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to fusion bonding of glass plates, particularly to vacuum fusion bonding of patterned glass plates which include etched features such as microstructure channels, and more particularly to an improved apparatus and method for vacuum fusion bonding of large area patterned glass plates.

Apparatus using a network of fluidic channels, such as microchannel arrays for chemical electrophoresis, involve the formation of the channels on one or both mating glass plates, for example, and the plates are bonded together, such as by fusion bonding. A common problem with fusion bonding is incomplete bonding of the areas, leaving thin, unbonded regions or voids. Even with the use of external force and pressure, voids are difficult to avoid. The concept of developing a partial vacuum between two substrates while maintaining an ambient or higher pressure outside the substrates has been used in mask aligners for some time, and this greatly enhances the area of close contact. The concept of using vacuum and fusion has been demonstrated on glass, and that process is described and claimed in copending U.S. application Ser. No. 09/067,022, filed Apr. 27, 1998, entitled "Vacuum Pull Down for an Enhanced Bonding Process", assigned to the same assignee.

Recently, an apparatus and method for vacuum fusion bonding of patterned glass plates, such as microstructure channels for chemical electrophoresis has been developed, and which eliminated intermediate bonding layers and solved the problem of conveniently applying the vacuum force with an apparatus that is compatible with high temperatures needed for glass fusion bonding and had potential use for very large substrates that are patterned with small features. This apparatus and method are described and claimed in copending U.S. application Ser. No. 09/039,522 filed Mar. 16, 1998, entitled "Vacuum Fusion Bonding of Glass Plates", assigned to the same assignee. While this apparatus and method of vacuum fusion bonding produced excellent glass to glass bonds, the apparatus has some practical limitation in ease of use, maintenance, and alignment. In that apparatus and method, the glass plate pair (top and bottom glass plates) was bonded with the plate which contained holes for pulling a vacuum in it being on top of the microchannel plate, which in turn, was placed on top of the main steel platform used for fusion bonding. At elevated bonding temperatures, the glass becomes soft enough to cause the surface texture of the steel platform to imprint in the microchannel plate bottom surface. This impedes subsequent high resolution optical imaging through the glass. In addition, the glass sometimes sticks a little to the steel platform and also to the vacuum pumpout block, as these components become progressively oxidized with repeated use. This may induce glass cracking and does require frequent cleaning and resurfacing of the steel fixturing. For very long structures, (more than ~40 cm) the glass on steel platform method is not viable, because of occasional cracking caused by large mismatches in thermal expansion and contraction. Also, the vacuum pumpout fixture of above-referenced application Ser. No. 09/039,522 was attached to the glass plate pair from the top on both ends, which made the loading and vacuum connection procedures awkward and fragile. This also imprints the top side on the ends with the steel finish texture.

The present invention provides several key improvements over the vacuum fusion bonding apparatus of above-referenced application Ser. No. 09/039,522, these including: (1) the glass plates are oriented so that the outside surface of the microchannel plate only contacts oven atmosphere during the bonding cycle; (2) the addition of an interlayer plate, such as graphite, eliminates any sticking of the glass to the steel base platform or imprinting of the steel platform texture on the glass; (3) temporary clamps are used to hold the assembly together between alignment/assembly and transport/connection to the vacuum port in the oven; (4) the vacuum path is now downward from the microchannel plate to the oven vacuum line whereby the application of vacuum pulls the whole assembly together and downwards onto a stable platform, and (5) provides alignment and temporary clamping of the glass plates prior to bonding. Thus, the present invention provides an improved apparatus and method for vacuum fusion bonding of large area patterned glass plates, such as microstructure channel for chemical electrophoresis. The invention is for microchannel or other arbitrary patterned glass plates. Microfluidic channels is the application (e.g. electrophoresis, gas chromatography). This method may also apply to low pressure gas channels, with multiple electrode access and thus could enable certain fixed pattern electric discharge display systems, or ionizing photon/particle detection systems.

SUMMARY OF THE INVENTION

It is an object of the present invention to provide an improved apparatus and method for the vacuum fusion bonding of glass plates.

A further object of the invention is to provide a vacuum fusion bonding apparatus which eliminates optical surface degradation due to the sticking to and/or imprinting of the steel base platform texture onto the microchannel plate.

Another object of the invention is to eliminate prior problems due to direct contact between a glass plate and the steel base platform by providing a non-sticking, vacuum conducting interlayer plate.

Another object of the invention is to provide a vacuum fusion bonding apparatus with means for establishing and maintaining alignment of large, patterned glass plate during the assembly, transport, vacuum connection, and bonding operations.

Another object of the invention is to provide an improved large glass plate vacuum fusion bonding apparatus and method which utilizes temporary clamps to hold the assembly together between alignment/assembly in a clean room and transport/connection of the glass plates in the vacuum bonding system.

Another object of the invention is to provide a vacuum fusion bonding apparatus for large area patterned glass plates wherein application of vacuum thereto pulls the entire assembly together with a large, distributed force, and wherein the compressive force is largest at the pumpout end.

Other objects and advantages of the present invention will become apparent from the following description and accompanying drawing. The present invention involves an improved apparatus and method for alignment and bonding of large patterned glass plates by vacuum fusion bonding. The present invention basically constitutes an improved apparatus and method over that of the above-reference application Ser. No. 09/039,522, and thus may utilize a glass plate pair of the construction and/or configuration of that prior apparatus. The primary improvement of the improved method of vacuum fusion bonding is the elimination of any adverse texturing or sticking of the glass plates due to being contacted by steel components during the high temperature bonding operation by the use of an interlayer plate. Also, the improved apparatus utilizes a downward vacuum flow path which eliminates the prior problems relative to loading and connection procedures while providing a large, distributed vacuum force for pulling the components of the apparatus together. The improved apparatus utilizes alignment pins which aid in assembly and transport. By using one or more temporary clamps, the components are retained in alignment position during assembly and during connection to the vacuum fusion bonding oven. The improved apparatus and method produce a complete fusion bond (void-free) of seamless, full-strength quality throughout the length and width of the plates, and has the capability for fusion bonding of large size (>40 cm long) glass plates, without the potential of cracking caused by the large mismatches in the thermal expansion and contraction of the prior glass on steel platform method. Also, the invention can be used in the fabrication of any apparatus using a network for microfluidic channels embedded between plates of glass or similar moderate melting point substrates having a gradual softening point curve, such as certain plastics and alloys. Also, the invention can be used for the assembly of glass-based substrates onto larger substrates; for example, for integrating flat panel display tiles onto much larger display screen systems. The invention finds use in chemical separation systems, hydraulics, chemical dispensing, 2D-displays, and 2D-detection systems.

BRIEF DESCRIPTION OF THE DRAWINGS

The accompanying drawing, which is incorporated into and forms a part of the disclosure, illustrates an embodiment of the invention and, together with the description, serves to explain the principles of the invention.

DETAILED DESCRIPTION OF THE INVENTION

The invention is directed to vacuum fusion bonding of glass plates and particularly to vacuum fusion bonding of glass plates wherein microfluidic channels are embedded between the plates. The invention involves an improved apparatus and method for vacuum fusion bonding of large, patterned glass plates, for example, and the apparatus and method are particularly applicable for the fabrication of microchannel arrays, such as utilized in chemical electrophoresis or other apparatus using a network of microfluidic channels embedded between plates of glass or similar moderate melting point substrates. The invention eliminates undesired texturing of the glass plates and the problems associated therewith, as well as providing alignment and an improved vacuum retaining arrangement.

As pointed out above, the present invention comprises an improvement of the apparatus and method of above-referenced application Ser. No. 09/039,522, and thus may utilize similar configured glass plates having etched channels, openings, and slot therein. For example the microchannel plate may include a microchannel array having straight lengths of 50 cm and greater with 400 to over 1,000 channels that are about 10–200 microns wide and about 20–75 microns deep. As in that previous apparatus, a SEM cross-section of a borosilicate glass microchannel, vacuum fusion bonded by the present invention, shows that it preserves the shape of the channel extremely well, with distortions upon fusing of less than a few (1–3) percent. The SEM showed that bond interface occurs horizontally across the top of the channel with no unbonded regions or voids, and there is no evidence of discontinuity or tendency to fracture along the interface when subjected to cleavage fracture forces.

The improved apparatus and method overcomes the limitations relative to ease of use, maintenance, and alignment of the above-referenced prior apparatus, while eliminating any glass texturing due to contact with the steel base plate during elevated bonding temperatures, which impedes subsequent high resolution optical imaging through the glass. Also, by the use of a non-adherent, vacuum coupling interlayer plate, such as graphite, sticking of the glass, as well as eliminating glass texturing, makes large improvements in quality, yield, and ease of use, and which enables bonding of very large glass structures. The alignment pins and temporary clamps provide improved assembly, transport, and connection of the assembled components to the vacuum system of the oven.

In the improved apparatus the vacuum path is from the oven vacuum line to the pumpout port on the side of the steel base platform, to the pumpout slot, which may have a width of 0.5 mm to 3 mm and length of 15 cm to 100 cm, in the platform upper surface, to via holes, having a diameter of 0.5 mm to 3 mm in the interlayer plate, to slots and holes in the microchannel plate, through the microchannels, to the dead-end in the holes at the other end of the microchannel plate which are blocked off. A key feature is that the application of vacuum pulls the whole assembly together with a large, distributed force; the overall arrangement is such that compressive force is largest at the pumpout port end. This is achieved with pattern layout and limited vacuum conductance of the microchannels and some small amount of leakage into the layer interfaces. Thermal differential expansion of the different layers takes place around this region and preserves the vacuum connection. As in above-referenced application Ser. No. 09/067,022, the glass plates of this embodiment are also patterned with a nested set of vacuum channel moats that surround the complete working patterns; nesting the moats provides excellent edge pressure and sealing. Moats too wide, >1 mm, collapse in the middle because of glass softening, and compressive bonding force is reduced significantly. A surface slot (versus holes into a manifold) is milled into the base platform to minimize compromising the milled flat lapped finish. Via holes (versus a large slot) in the flat polished graphite interlayer plate help to keep it strong, and prevent breakage in use and fabrication. The milled-through slot and a few holes in the glass hole plate provide a uniform vacuum to the surface-etched features in the microchannel plate; contacting the glass with just a few small via holes in the graphite interlayer plate, minimizes distortion of the glass hole plate at the interface. If the glass features are smaller than the holes in the graphite interlayer plate, the glass overhang can sag in to the graphite via hole fusion temperatures.

Referring now to the drawing, the improved vacuum fusion bonding apparatus, generally indicated at 10, basically comprises a steel base platform 11, a non-stick (graphite or boron nitride) interlayer plate 12, and temporary clamps 13 (only one shown), which functions to hold together a microchannel substrate or plate 15 and a hole substrate or plate 14. The plates are bonded upside down from the normal electrophoresis use. The base platform may have a length of 10 cm to 70 cm and width of 5 cm to 30 cm.

As shown and described hereinafter, the plates 14 and 15 are located upside-down during fusion bonding. Base platform 11 is provided with one or more openings 16 into which a member of a clamp 13 is inserted, a pumpout port 17, a pumpout slot 18, and an alignment opening or countersink 19 into which an alignment pin 20 is located. The non-stick (graphite or boron nitride) interlayer plate 12 is provided with vacuum via holes 21 (only one shown) which align with pumpout slot 18, and an alignment opening or counter-sink 22 into which alignment pin 20 extends. Interlayer plate 12 may also be constructed of graphite, boron nitride, or ceramics, and has a thickness of 1 mm to 10 mm. The alignment pin may be composed of metal or ceramics having a diameter of 1 mm to 3 mm and length of 3 mm to 8 mm. The hole plate 14 is provided with a slot or holes 23 which align with vacuum via holes 21, and spaced from the slot or holes 23 are a plurality of holes 24 (only one shown). The glass microchannel plate 15 is provided with a number of microchannels 25 which terminate at each end adjacent the slot or holes 23 and the holes 24. The slot or holes 23 also are aligned with a moat pattern in the channel plate 15, not shown, which extends around the microchannels 24, as described above. The graphite interlayer plate 12 and the glass hole plate 14 are each provided with an opening or counter-sink 26 and 27, respectively, into which an additional alignment pin 28 is positioned, pin 28 being constructed as described above relative to pin 20. The temporary clamp or clamps 13 include a U-shaped member 29 and a screw or threaded member 30 which threadly extends through an end or arm 31 of U-shaped member 29 and abuts the surface 32 of microchannel plate 15, and an opposite end or arm 33 of U-shaped member 29 extends into one or more opening 16 in the base platform. Thus, the vacuum fusion bonding arrangement illustrated in the drawing utilizes base platform to interlayer plate alignment and interlayer plate to hole plate alignment, in addition to the use of temporary clamps, and vacuum pumpout of all the components through the base platform, which yields an untouched, defect free surface on the very top after the temporary clamp(s) 13 are removed, which is the outside or bottom of the microchannel plate, which greatly improves optical access through this smoother surface. The addition of a completely non-adherent, polished (graphite) interlayer with alignment and location features makes large improvements in the outer surface finish of plate 14, and in the quality, yield, and ease of use and enables bonding of very large glass structures (e.g. 30 cm×70 cm).

Assembly of the improved vacuum fusion bonding approach of the present invention starts with a loose fitting steel alignment pin 20 in the center of an end of base platform 11 and the graphite interlayer 12 placement onto it; which anchors the interlayer 12 at one point only and it can differentially expand only toward the other end. Optional alignment screws (not shown) on vertical posts, can now be temporarily added to the base platform 11 for pushing the microchannel plate 15 into critical alignment with the hole plate 14. The hole plate 14 is added next, and alignment pin 28 is inserted into openings 26 and 27 in interlayer plate 12 and hole plate 14 which provides a glass plate-to-interlayer plate alignment, and with temporary glass plate spacer shims (not shown) on the ends of hole plate 14. The microchannel plate 15 is now added and aligned to the hole plate 14; while the glass pair (14-15) is aligned, hand pressure in the middle results in strong glass-to-glass sticking contact and the end shims can be slid out. The glass plate pair (14-15), as a pair, is now finally aligned onto the via holes 21 in the interlayer 12. The temporary clamps 13 are now added around the periphery of the assembly; they facilitate more glass-to-glass sticking and keep the entire assembly together and aligned until placement in a vacuum oven (not shown) and connection of the pumpout port 17 to a vacuum system (not shown) in the vacuum oven. Applying vacuum binds the whole assembly tightly together and the temporary clamps 13 and posts (not shown) are removed, and the oven bonding cycle commences, which takes the glass plates 14 and 15 up to the softening point (temperature of 650° C. to 680° C.) for about one hour, for example; the oven ambient is a slight overpressure of flowing high purity nitrogen, for example, at a pressure of 500 to 2000 Pa.

A complete fusion bond of seamless, full-strength quality is obtained through the composite glass pair (plates 14 and 15), because the glass is heated into its softening point. The complete void-free bond is possible because of the large distributed force that is developed that presses the two plates together from the difference in pressure between the furnace or oven ambient (high pressure) and the channeling and microstructures in the glass plates (low pressure). The improved apparatus and method enables the glass plates to be fully supported by a large, high thermal conductivity platform via a non-adherent (graphite) interlayer. This enables the glass plates to fully melt together forming a composite plate but in a manner that preserves the small microstructure features (microchannels, etc.) within the composite plate and supports the glass plates to prevent overall sagging or warping during the bonding cycle. The flattened smooth outer surface of the microchannel plate is optimal for the shallow depth of focus laser fluorescent optical probes for the microchannels. The detection of the fluorescence signal is also made easier by having a flat smooth (non-textured) optical window over the channels (provided by the flat glass cover or hole plate or the bottom of microchannel plate) through which laser excitation of fluorescence occurs with less scattered light of the primary laser beam to contribute to the overall noise level.

While glass plates have been illustrated and described in the bonding method of the invention, other materials, such as certain plastics and alloys, having similar moderate melting points with a gradual softening point curve can be utilized. Also, the platform and interlayer plate may be replaced with a single, thick graphite member.

Thus, the present invention can be utilized to form components for any apparatus using a network of microfluidic, liquid or gas, channels embedded between plates of glass or similar materials. This invention can be applied to fabrication of analytical capillary-based chemical analytical instruments, such as for chemical electrophoresis, miniature chemical reactor or distribution (fan-in, fan-out) systems; microchannel coolers, radiator or heat exchanges; gas manifold, mixing, and distribution systems; miniature hydraulic systems for power fluidics or display or detection; and assembly of glass-based substrates onto larger substrates; for example, for integrating flat panel display tiles onto a larger display screen system.

While a particular embodiment of the apparatus has been illustrated and described along with a description of particular materials, parameters, and operation sequence to exemplify and teach the principles of the invention such are not intended to be limiting. Modifications and changes may become apparent to those skilled in the art, and it is intended that the invention be limited only by the scope of the appended claims.

What is claimed is:

1. An improved apparatus for producing embedded microstructures by vacuum fusion bonding, including:

a base platform having a flat upper surface, a vacuum pumpout port adapted to be connected to a vacuum system of an associated vacuum fusion oven, a vacuum pumpout slot connected to said port, and an opening in spaced relation to said port and slot, an interlayer plate positioned on said flat upper surface of said base platform having vacuum via holes extending therethrough, and at least one opening in one side thereof and in spaced relation to said holes, at least one alignment pin located in said opening in said base platform and said opening in said interlayer plate for aligning said vacuum via holes of said interlayer plate with said slot in said base platform, and at least one removable clamping means adapted for clamping an associated pair of plates to be vacuum fusion bonded to said interlayer plate.

2. The improved apparatus of claim 1, additionally including another opening in an opposite side of said interlayer plate, and another alignment pin positioned in said another opening an adapted to be positioned in an opening in an associated plate to be bonded.

3. The improved apparatus of claim 1, wherein said base platform is constructed of steel, and wherein said interlayer plate is constructed of a non-adherent material.

4. The improved apparatus of claim 3, wherein said non-adherent material is selected from the group consisting of graphite, boron nitride and ceramics.

5. The improved apparatus of claim 1, wherein said base platform is additionally provided with at least one opening in a side surface thereof, said at least one removable clamping means including a member adapted to be positioned in said opening.

6. The improved apparatus of claim 5, wherein said member of said at least one removable clamping means is of a U-shaped configuration having end arm sections, and a threaded member located in one arm section and the other arm section being adapted to extend into said opening in said side surface of said base platform.

7. The improved apparatus of claim 1, in combination with a pair of plates to be bonded together, a first of said pair of plates being positioned on said interlayer plate and having openings therethrough which align with said vacuum via holes in interlayer plate, a second of said pair of plates having at least one channel therein and positioned on said first of said pair of plates such that ends of said channels are in fluid communication with said openings in said first of said pair of plates; and wherein said removable clamping means clamps said pair of plates on said interlayer plate; and whereby vacuum applied to said pumpout port of said base platform causes said pair of plates to be drawn together, whereby said removable clamping means can be removed prior to vacuum fusion bonding of said pair of plates.

8. The combination of claim 7, wherein said pair of plates are constructed of material having a moderate melting point and a gradual softening point curve.

9. The combination of claim 8, wherein said material of said pair of plates is selected from the group consisting of glass, plastics, and alloys.

10. The combination of claim 7, wherein said second of said pair of plates has 1 to at least 1,000 microchannels therein.

11. The combination of claim 10, wherein each of said channels in said second of said pair of plates has a length of up to or greater than 50 cm, a width of 10–200 microns, and a depth of 20–75 microns.

* * * * *